Oct. 16, 1928.
P. E. BANG
1,688,104
WINDSHIELD CLEANER
Filed Dec. 7, 1927
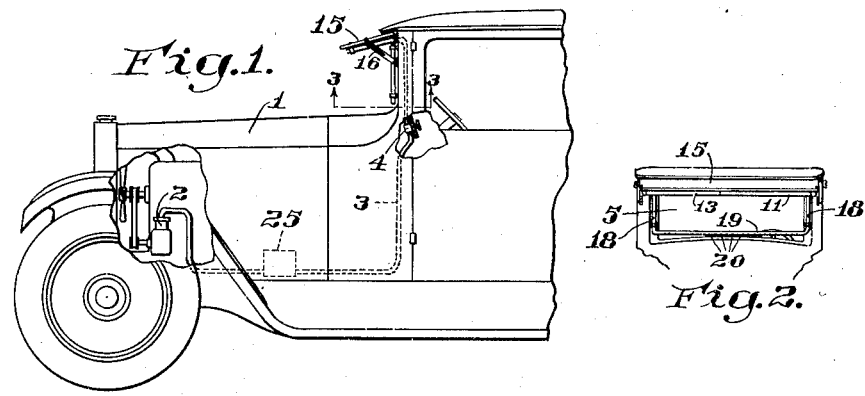
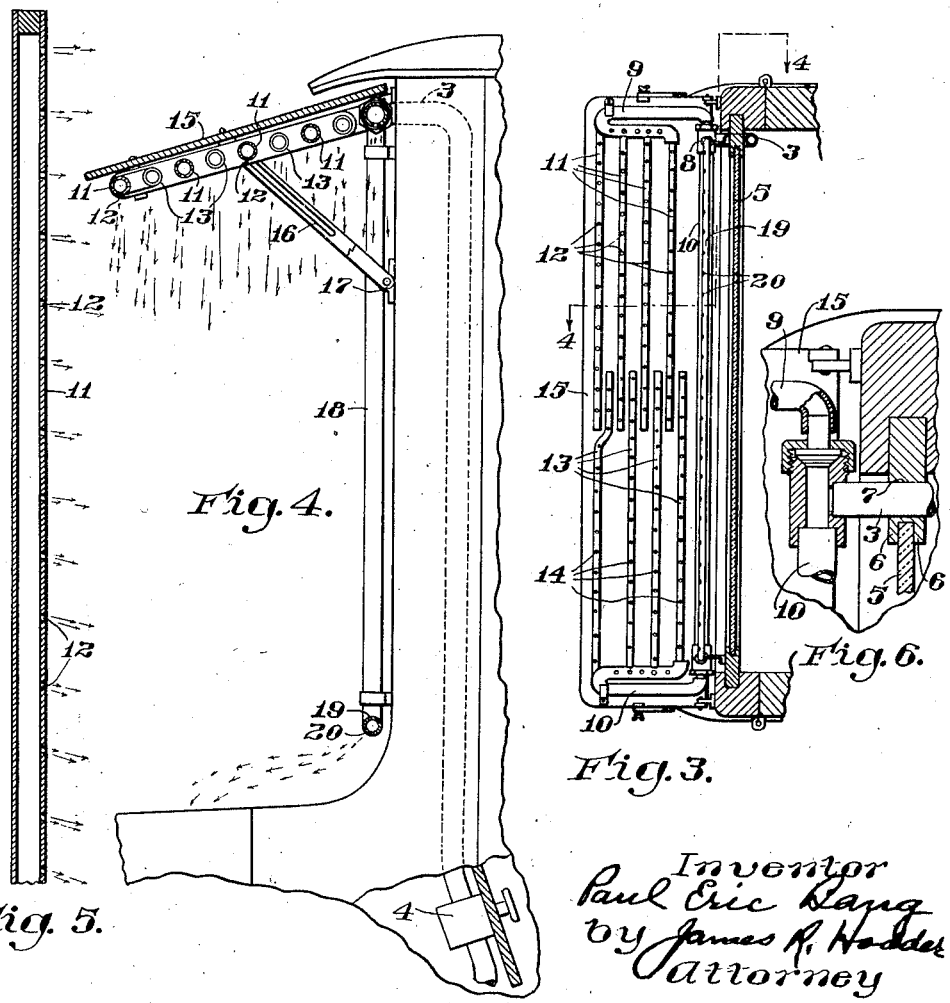
Inventor
Paul Eric Bang
by James R. Hodder
Attorney Patented Oct. 16, 1928.

1,688,104

UNITED STATES PATENT OFFICE.

PAUL ERIC BANG, OF NEWTON, MASSACHUSETTS.

WINDSHIELD CLEANER.

Application filed December 7, 1927. Serial No. 238,451.

My invention relates to improvements in windshield cleaners for automobiles, trolley cars, and other vehicles.

The object of my invention is to devise a method of, and apparatus for, keeping the windshield free of dust, snow, rain, or sleet which might strike and collect upon it and thereby obstruct the view of the driver. Preferably I provide means to so deflect the air currents ordinarily impinging upon the windshield as to prevent the dust, snow, rain, etc., from reaching the surface of the windshield, and hence preventing the windshield becoming obstructed.

In carrying out my invention I provide continuous columns or streams of air under pressure flowing downwardly and forwardly of the windshield, thus forming a screen or curtain of air which will thus prevent rain, snow, sleet, or dust from ever reaching the windshield by deflecting the air carrying the same.

I am aware that air under pressure has been used before in an effort to clear a windshield, but I have developed a novel and more efficient means of utilizing the same, which will be hereinafter fully explained.

I provide a pump to compress air, and then the air is conducted through to a series of pipes, conduits, or the like concealed under and attached to an adjustable sun visor, said pipes, conduits, or the like being equipped with angularly positioned holes, so that the streams of air will be forced in any desired direction. The sun visor, being adjustable, allows the angle of the holes to be regulated and the air streams to be forced in a forwardly direction, which may be calculated to allow for the forward movement of the car, to provide the air deflection desired. Across the bottom of the windshield I may construct another tube, conduit, or the like, also equipped with a plurality of holes, which tube co-operates with the others to deflect from the windshield any rain, snow, hail, or dust that may be blown downward by the upper series of pipes. Thus, by my invention, I assure at all times a clear and transparent windshield.

Referring to the drawings, a preferred embodiment of my invention is illustrated wherein Fig. 1 is a fragmentary side elevation of an ordinary type of automobile;

Fig. 2 is a front elevation, on reduced scale, of the windshield with the cleaner in position;

Fig. 3 is a bottom plan cross sectional view of the cleaner in position;

Fig. 4 is a cross sectional view on the line 4—4 of Fig. 3;

Fig. 5 is a detail of one of the pipes shown in Fig. 3;

Fig. 6 is a cross sectional detail of the joints where the pipe pierces the windshield, as shown in Fig. 3.

As shown in the drawings, numeral 1 indicates any ordinary type of automobile, and 2 shows any existing type of automobile pump. The air is pumped through a tubing, piping, or the like 3, connected to said pump 2, and led forward through the engine and up inside the car to either corner of the dashboard, where a suitable valve 4 to control the flow of compressed air is positioned. The air continues in the pipe 3 up the side of the windshield 5, finally intersecting the frame 6 at 7 above the top of the windshield 5, and then entering the union 8, where part of the air follows along the conduit 9 to the tubes 11 and thence through the holes 12, and part follows along the conduit 10 to the tubes 13, and thence through the holes 14, the conduits 9 and 10, and tubes 13 and 14 being hidden and covered by the sun visor 15, and still another part of the air goes down the conduit 18 to the tube 19 and thence through the holes 20. The sun visor 15 may be positioned at any angle desired by means of regulating the slotted brace 16 pivotally adjusted at 17. The holes 12 and 14 are all positioned at a slant to cause the streams of air to flow forward thus allowing for the movement of the car and keeping any snow, rain, dust or the like from ever coming into contact with the windshield 5. The holes 20 are angled so as to blow a bit downwardly and provide curtains of air to account for any snow, rain, dust, or the like which may seep in below the other columns of air.

It will thus be seen that I have devised a novel and efficient windshield cleaning invention which will be inexpensive to manufacture and easy to incorporate on the automobile. Furthermore, I can attach apparatus carrying out my invention to any existing type of automobile and to any existing windshield, whether adjustable or rigid. Furthermore, if desired, the air can be heated as it passes adjacent the engine and, if desired, any other connections for the air pump, instead of taking the same off the fan belt as shown, can be utilized. The essence of my invention is the conveying of air under pressure, preferably high pressure, to and through a plurality of tubes distributed about and in front of the vehicle windshield with air nozzle or delivery means, preferably at an angle, to deflect the normal air currents from impinging on the surface of the windshield, thus preventing the rain, snow, dust, or the like carried by such normal air currents from reaching and sticking to or collecting on the windshield. This feature I believe new, and wish to claim same herein broadly.

Having thus described my invention, what I claim as new is:

1. The combination with the sun visor and windshield of a vehicle, of a conduit extending outwardly from the top of said windshield at each upper side thereof, a conduit extending between said first two conduits at the top of and closely adjacent to said windshield and having perforations in the bottom thereof, a plurality of tubes attached to said first two conduits and in close relation with said sun visor, said tubes being arranged in staggered relation and each tube extending but partially across said visor, each of said tubes having perforations in their bottoms, a conduit extending from one of the said first two conduits downwardly and at one side of said windshield, and then transversely of said windshield adjacent to the bottom thereof and having perforations in the bottom of said transverse portion, and means to transmit air under pressure to said conduits and tubes.

2. The combination with the sun visor and windshield of a vehicle, of a conduit extending outwardly from the top of said windshield at each upper side thereof, a conduit extending between said first two conduits at the top of and closely adjacent to said windshield and having perforations in the bottom thereof, a plurality of tubes attached to said first two conduits and in close relation with said sun visor, said tubes being arranged in staggered relation and each tube extending but partially across said visor, each of said tubes having perforations in their bottoms, and means to transmit air under pressure to said conduits and tubes.

3. The combination with an adjustable sun visor, of a plurality of perforated conduits extending lengthwise of said sun visor, said conduits being movable simultaneously with said sun visor to adjusted position, and means to transmit air under pressure to said conduits in any position to which they may be adjusted.

4. The combination with an adjustable sun visor and a windshield, of a plurality of perforated conduits extending lengthwise of said sun visor, said conduits being movable simultaneously with said sun visor to adjusted position, a fixed perforated conduit located adjacent to the bottom of said windshield, and means to transmit air under pressure to said movable conduits and said fixed conduit simultaneously.

In testimony whereof, I have signed my name to this specification.

PAUL ERIC BANG.